United States Patent [19]
Kurtzberg et al.

US006120552A

[11] Patent Number: 6,120,552
[45] Date of Patent: Sep. 19, 2000

[54] METHOD TO EXHIBIT PARALLELISM FOR COMPUTER IMPLEMENTATION OF COMPUTATIONAL PROCESSING

[75] Inventors: Jerome M. Kurtzberg; Menachem Levanoni, both of Yorktown Heights; John Stephen Lew, Ossining, all of N.Y.

[73] Assignee: International Business Machines Corporation, Armonk, N.Y.

[21] Appl. No.: 09/085,158

[22] Filed: May 27, 1998

[51] Int. Cl.[7] ....................................................... G06F 9/45
[52] U.S. Cl. .................................. 717/5; 717/8; 712/202
[58] Field of Search .................................. 395/705–709; 712/200, 202, 208, 220, 221; 708/490, 523, 524, 603, 604; 717/5, 6, 7, 8, 9

[56] References Cited

U.S. PATENT DOCUMENTS

| 4,495,592 | 1/1985 | Caldwell et al. | 708/620 |
|---|---|---|---|
| 4,519,045 | 5/1985 | Caldwell et al. | 708/146 |
| 4,667,290 | 5/1987 | Goss et al. | 395/707 |
| 5,105,353 | 4/1992 | Charles et al. | 395/709 |
| 5,193,192 | 3/1993 | Seberger | 395/709 |
| 5,490,255 | 2/1996 | Rawlinson et al. | 712/219 |
| 5,553,304 | 9/1996 | Lipner et al. | 707/104 |
| 5,603,021 | 2/1997 | Spencer et al. | 707/4 |
| 5,633,998 | 5/1997 | Schlafly | 714/1 |
| 5,758,163 | 5/1998 | Safonov | 395/708 |
| 5,867,649 | 2/1999 | Larson | 709/201 |
| 5,991,902 | 11/1999 | Yoshida | 714/710 |

OTHER PUBLICATIONS

Sperber et al., "The essence of LR parsing", ACM, 1995, pp 146–155.
Hendrickson, "A new parallel LR parsing algorithm", ACM, 1995, pp 277–281.
Hayashi et al., "A speeding up method of parsing–stack operations for LR parsers", IEEE, 1996, pp619–629.
Costa et al., "Andora–I: A parallel Prolog system that transparently exploits both ANd and Or parallelism", ACM, 1991, pp 83–93.
Waddle, "Production trees : A compact representation of parsed programs", ACM Trans. on Prog. Lang., v 12. No. 1, 1990, pp 61–83.
Ganapathi et al., "Affix Grammar driven code generation", ACM Trans. on Prog. Lang., v7, No. 4, 1985, pp. 560–599.

*Primary Examiner*—Kakali Chaki
*Attorney, Agent, or Firm*—Scully, Scott, Murphy & Presser; Stephen C. Kaufman, Esq.

[57] ABSTRACT

The present invention describes a method for a one-pass parsing algorithm for generation of a Polish string that computationally defines the maximal possible parallel execution of a general class of arithmetic expressions using one operator stack and two operand stacks. This invention relaxes the assumption that in a processor, only one operation can be performed at any given time.

30 Claims, 8 Drawing Sheets

| | 10 HIGH ORDER STACK | 20 LOW ORDER STACK | 30 OPERATOR STACK |
|---|---|---|---|
| step 1 : A | | 1A | |
| step 2 : + | | 1A | + |
| step 3 : B | | 2B<br>1A | + |
| step 4 : + | | 2B<br>1A | +<br>+ |
| step 5 : C | | 3C<br>2B<br>1A | +<br>+ |
| step 6 : + | | 3C<br>2B<br>1A | +<br>+<br>+ |
| step 7 : D | | 4D<br>3C<br>2B<br>1A | +<br>+<br>+ |
| step 8 : ; | 3+CD | 2B<br>1A | +<br>+ |
| step 9 : | 1+AB<br>3+CD | | + |
| step 10 : | 1++AB+CD | | |

| | HOS | LOS | RS |
|---|---|---|---|
| ( | | ~ | ~ |
| ( | | ~<br>~ | ~<br>~ |
| A | | 1A<br>~<br>~ | ~ |
| - | ~<br>~ | 1A<br>~<br>~ | - |
| B | ~<br>~ | 2B<br>1A<br>~<br>~ | - |
| ) | 1-AB<br>~ | ~ | |
| * | 1-AB<br>~ | ~ | * |
| C | 1-AB<br>~ | 2C<br>~ | * |
| - | 1*-ABC<br>~ | ~ | - |
| ( | ~<br>1*-ABC<br>~ | ~<br>~ | - |
| D | ~<br>1*-ABC<br>~ | 2D<br>~<br>~ | - |

FIG.6a-2

| HOS | | LOS | RS |
|---|---|---|---|
| - | ~<br>1*-ABC<br>~ | 2D<br>~<br>~ | - |
| E | ~<br>1*-ABC<br>~ | 3E<br>2D<br>~<br>~ | - |
| ) | 2-DE<br>1*-ABC<br>~ | ~ | - |
| * | 2-DE<br>1*-ABC<br>~ | ~ | *<br>- |
| F | 2-DE<br>1*-ABC<br>~ | 3F<br>~ | *<br>- |
| ) | 2*-DEF<br>1*-ABC<br>~ | ~ | - |
|   | 1-*-ABC*-DEF | | |
| / | 1-*-ABC*-DEF | | / |
| ( | ~<br>1-*-ABC*-DEF | ~ | / |
| ( | ~<br>~<br>1-*-ABC*-DEF | ~ | / |

FIG.6b-1

| | HOS | LOS | RS |
|---|---|---|---|
| G | ~<br>~<br>1-*-ABC*-DEF | 2G<br>~<br>~<br>~ | /  |
| - | ~<br>~<br>1-*-ABC*-DEF | 1G<br>~<br>~<br>~ | -<br>/ |
| H | ~<br>~<br>1-*-ABC*-DEF | 3H<br>2G<br>~<br>~ | -<br>/ |
| ) | 2-GH<br>~<br>1-*-ABC*-DEF | ~ | / |
| * | 2-GH<br>~<br>1-*-ABC*-DEF | ~ | *<br>/ |
| I | 2-GH<br>~<br>1-*-ABC*-DEF | 3I<br>~ | *<br>/ |
| - | 2*-GHI<br>~<br>1-*-ABC*-DEF | ~ | -<br>/ |
| ( | ~<br>2*-GHI<br>~<br>1-*-ABC*-DEF | ~<br>~ | -<br>/ |

FIG.6b-2

| | HOS | LOS | RS |
|---|---|---|---|
| J | ~<br>2*-GHI<br>~<br>1-*-ABC*-DEF | 3J<br>~<br>~ | /  |
| - | ~<br>2*-GHI<br>~<br>1-*-ABC*-DEF | 3J<br>~<br>~ | −<br>−<br>/ |
| K | ~<br>2*-GHI<br>~<br>1-*-ABC*-DEF | 4K<br>3J<br>~<br>~ | −<br>/ |
| ` | 3-JK<br>2*-GHI<br>~<br>1-*-ABC*-DEF | ~ | −<br>/ |
| * | 3-JK<br>2*-GHI<br>~<br>1-*-ABC*-DEF | ~ | *<br>−<br>/ |
| L | 3-JK<br>2*-GHI<br>~<br>1-*-ABC*-DEF | 4L<br>~ | *<br>−<br>/ |
| ) | 3*-JKL<br>2*-GHI<br>~<br>1-*-ABC*-DEF | ~ | −<br>/ |
| | 2-*-GHI*-JKL<br>1-*-ABC*-DEF | | / |
| ; | 1/-*-ABC*-DEF-*-GHI*-JKL | | |

METHOD TO EXHIBIT PARALLELISM FOR COMPUTER IMPLEMENTATION OF COMPUTATIONAL PROCESSING

BACKGROUND OF THE INVENTION

1. Field of the Invention

This invention is applicable to the arithmetic-logic unit (ALU) or that functional part of a digital computer that carries out arithmetic and logic operations on operands. More particularly the invention is directed to a parsing technique for arranging the input information received by the ALU, which consists of operands, operation codes, and format codes.

2. Description of Prior Art

In the process of compilation into machine executable code of a program written in a high-level language, the procedure for examining arithmetic expressions and determining operator precedence, the order of execution of the operators, is often referred to as the arithmetic scan. Since syntactically correct arithmetic expressions are well formed in that they possess regular properties related to the operands and the operators, many specialized parsing or scanning techniques have been developed.

Although it is algebraically well defined, an arithmetic expression is not computationally well defined unless the precise order of arithmetic operations is specified. The specification of ordering can be exhibited by a computation tree, by a fully parenthesized statement or by a Polish form such as Polish prefix notation.

One possible, but impractical, technique is to require the programmer to write arithmetic expressions in fully parenthesized notation (i.e., parentheses must be placed around each pair of operands and its associated operator) to obviate the need for knowledge about the relationships between operators in determining the order in which the operations are to be performed.

Most commonly used are transformational systems, which convert the normal infix form (i.e., the form in which the operator is placed between its operands) to a Polish form, in which there exist no parentheses and the order of execution of the operators is specified by their positioning. Such a system is needed because of the difficulty of associating operands with operators in infix notation.

Polish notation was originally developed in the prefix form, in which the operators precede the operands.

The postfix or suffix form, also known as reverse Polish notation or RPN, which is logically equivalent to the prefix form, has been widely used in computing. Many compilers first transform an arithmetic expression from its ordinary or infix form into RPN, so that its evaluation can be done in a single left-to-right scan.

Figure 1:
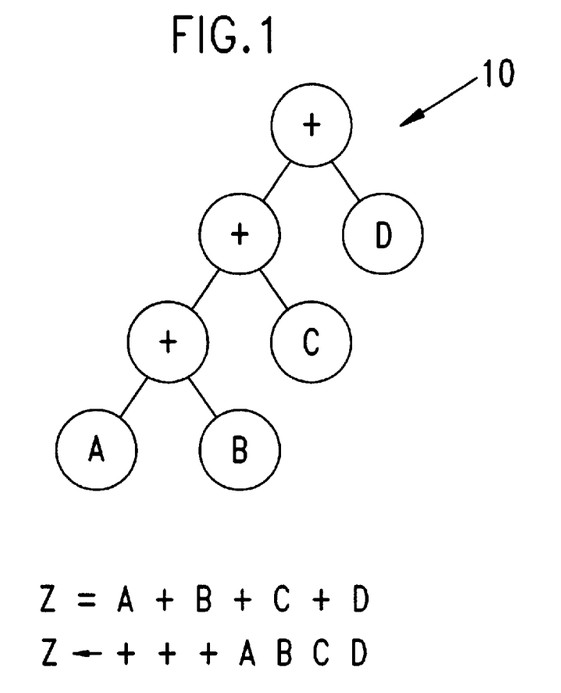
FIG. 1 is a tree diagram of equation "Z=A+B+C+D"

The usual approach for parsing arithmetic expressions is to make a one pass scan over the string of characters, operands and operations, to transform them into a Polish form by using single operand stack and operator stacks. An implicit assumption is made that these Polish strings are to be operated upon by a computing system that permits only one arithmetic operation to be performed at any given time. For example, the arithmetic expression $$\text{``}Z=A+B+C+D\text{''}$$

would be transformed into the Polish prefix string $$\text{``}Z \leftarrow +++ABCD\text{''}$$

which defines the computation tree 10 shown in FIG. 1. The operator precedence is not pre determined and no operational subgroupings or associations are pre defined. Hence, this parsed expression may only be operated upon sequentially, e.g., by a one processor.

SUMMARY

The present invention is directed to a method and an apparatus for an efficient one-pass parsing algorithm that exhibits in a compiler suitable Polish prefix form the maximal degree of computational parallelism within an arithmetic expression. Multiple processing units then may simultaneously operate upon the parsed expression, while one of the processing units parses the next arithmetic expression.

A general parsing algorithm of the present invention would relax the assumption that in a processor only one operation can be performed at any given time. By using one operator stack and two operand stacks the present invention produces a one-pass parsing algorithm for the generation of a Polish string that computationally defines the maximal possible parallel execution of a general class of arithmetic expressions.

For purposes of this disclosure, operands are taken left-to-right within an operand grouping and the associated operations are taken from right-to-left. The expression $$Z=A+B+C+D$$

would then be transformed into $$Z \leftarrow ++AB+CD$$

which defines the computation tree with maximal parallelism. Hence, expressions +AB and +CD can be evaluated simultaneously by independent processors.

DETAILED DESCRIPTION OF THE INVENTION

Figure 2:
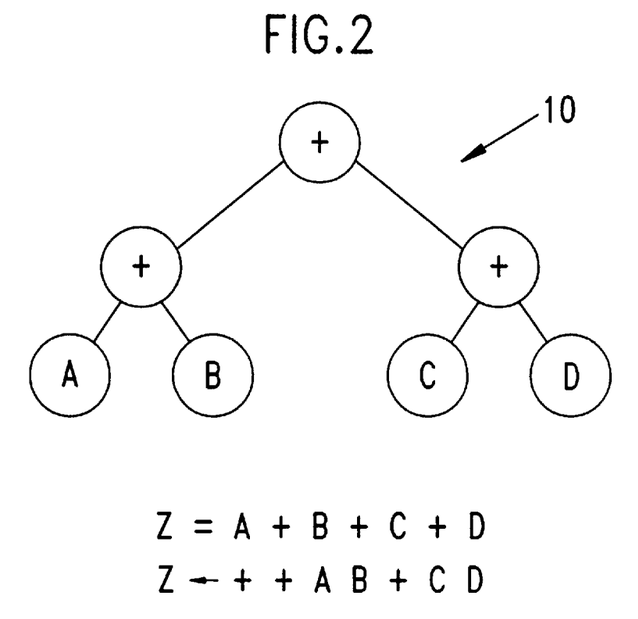
FIG. 2 is a tree diagram of an alternative interpretation of equation "Z=A+B+C+D"

FIG. 2 shows the computation tree 10 defined by the expression $$Z=A+B+C+D$$

which, for maximal parallelism, is transformed by the algorithm of the present invention into $$Z \leftarrow ++AB+CD$$

The following criteria are followed by the algorithm of the present invention.

1. The arithmetic expression is well-formed, i.e., it is syntactically legal, and all operations are defined. In a well-formed arithmetic expression the commutative and non-commutative operations are recognizable and unary and binary symbols are distinguishable, e.g., unary minus is distinguishable from binary minus. An assumption is made that precedence is established for all the operations, e.g., multiplication has higher precedence than addition.

2. Three last in, first out (LIFO) stacks are available. These stacks are respectively, the low order operand stack (LOS), the high order operand stack (HOS) and the operator stack (RS).

3. The arithmetic expression consists of a string of characters classified into the following categories:
   (a) variable or operand,
   (b) operation,
   (c) left parenthesis, "(",
   (d) right parenthesis, ")",
   (e) end-of-string delimiter, ";".

4. The two variables or operands, which produce a new variable through the action of an operation, are collectively termed a variable pair. Each variable is tagged with a unique precedence index, the low order variable in the variable pair is tagged with the lowest precedence index and the high order variable is tagged with the highest precedence index.

5. The characters in the string are sequentially scanned from left to right by a sequence counter (pointer) whose value or sequence number indexes the characters in the string.

The Parsing Algorithm

The algorithm of the present invention consists of three phases: the initialization phase, the character scanning and processing phase, and the stack processing phase. At the initialization phase, the pointer is set to point to the first character in the arithmetic expression string, i.e., it is set to one, and the variable precedence index is set to one and the stacks are emptied.

Figure 3:
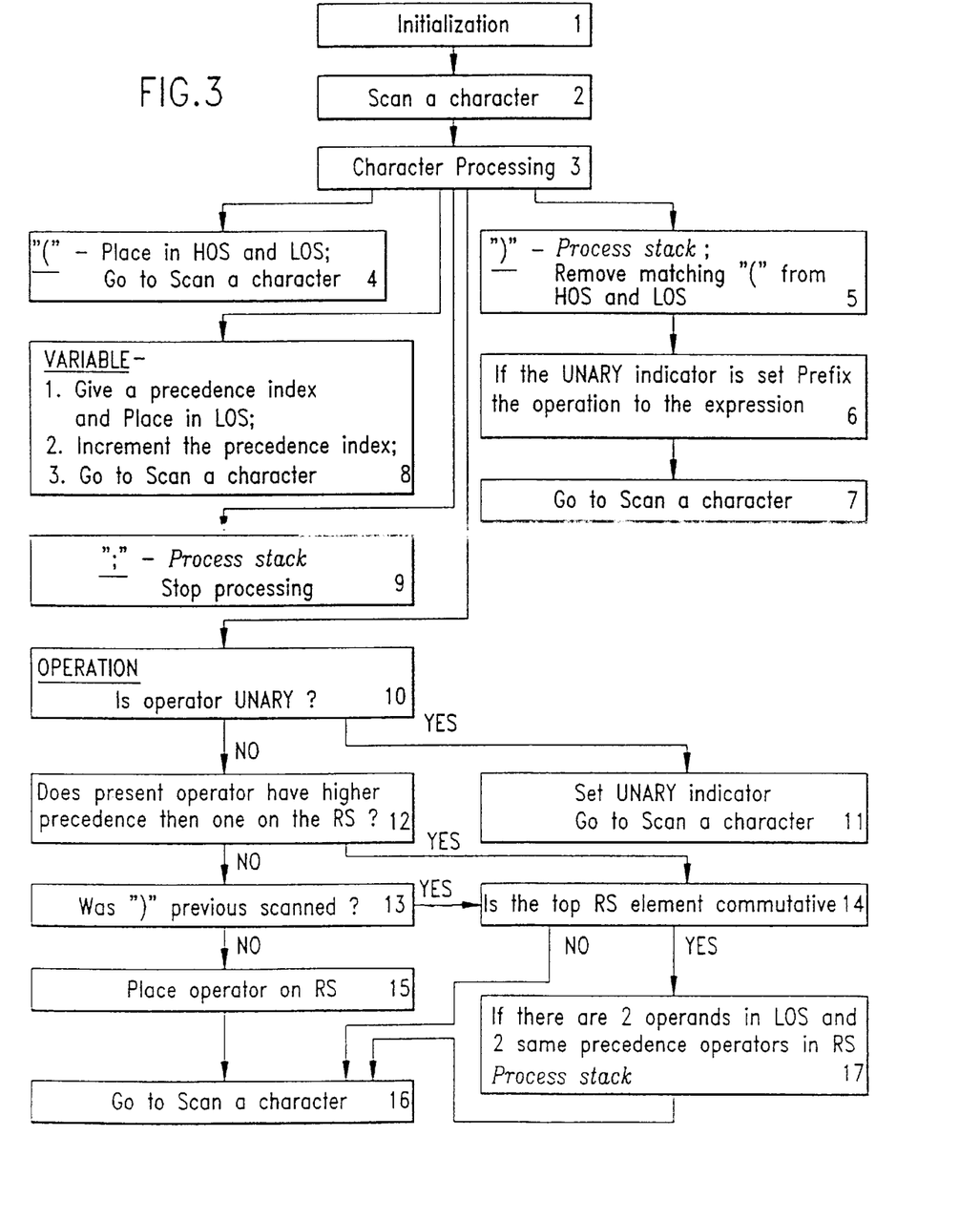
FIG. 3 shows a flowchart of the character scanning and processing phase of the present invention.

FIG. 3 shows the character scanning and processing phase 12 of the present invention. The character in the string position given by the pointer is scanned by the "scan a character" module 1 and processed according to its category by the "Character Processing" module 3. As defined above in the criteria (3), a character group consists of the variable or operand, the operation, the left parenthesis, the right parenthesis and the end-of-string delimiter.

If the character is a variable, the control is passed to the "Variable Processing" module 8. The "Variable Processing" module 8 tags the character with the current precedence index and places it into the low order operand stack. The precedence index is then incremented, the character pointer is advanced and the next character is scanned by the "Character Scanning" module 2.

If the character is an operation, the "Character Processing" module 3 calls the "Operation Processing" module 10. The character is tested to determine if it is unary. If this is the case, an appropriate indicator is set by module 11, the character pointer is advanced and the next character is scanned by the "Character Scanning" module 2.

If the character is not a unary operation, two tests 12, 13 are performed to determine whether the scanned operation has higher precedence than the top element in the operator stack, and whether the previous scanned character is not a right parenthesis. Failure of either test 12, 13 results in the operation character being placed into the operator stack by module 15, the character pointer is then advanced and the next character is scanned by the "Character Scanning" module 2.

Passage of either test 12, 13 results in testing of the top element in the operator stack, by module 14, to determine if it is a commutative or a non-commutative operation. If the operation is non-commutative, then the character pointer is advanced and the next character is scanned by the "Character Scanning" module 2.

If the operation is commutative, a determination is made, by module 17, whether there are two variables in the low order operand stack and whether the top two operations in the operator stack have the same precedence. Satisfaction of these conditions invokes the stack processing procedure shown in FIG. 4. Then, the character pointer is advanced and the next character is scanned by the "Character Scanning" module 2.

If the character is a left parenthesis, "(", then module 4 enters a special parenthesis character into both the high order operand stack and the low order operand stack, the character pointer is advanced and the next character is scanned by the "Character Scanning" module 2. If the character is a right parenthesis, ")", then module 5 repeatedly invokes the stack processing procedure to process the scanned equation within a set of parentheses. The special left parenthesis characters are then deleted from both the high order operand stack and the low order operand stack. Module 6 then determines whether the expression within the parenthesis is operated upon by a unary operation. That unary operation is then prefixed to the expression located on the stack. The character pointer is advanced and the next character is scanned by the "Character Scanning" module 2.

Figure 4:
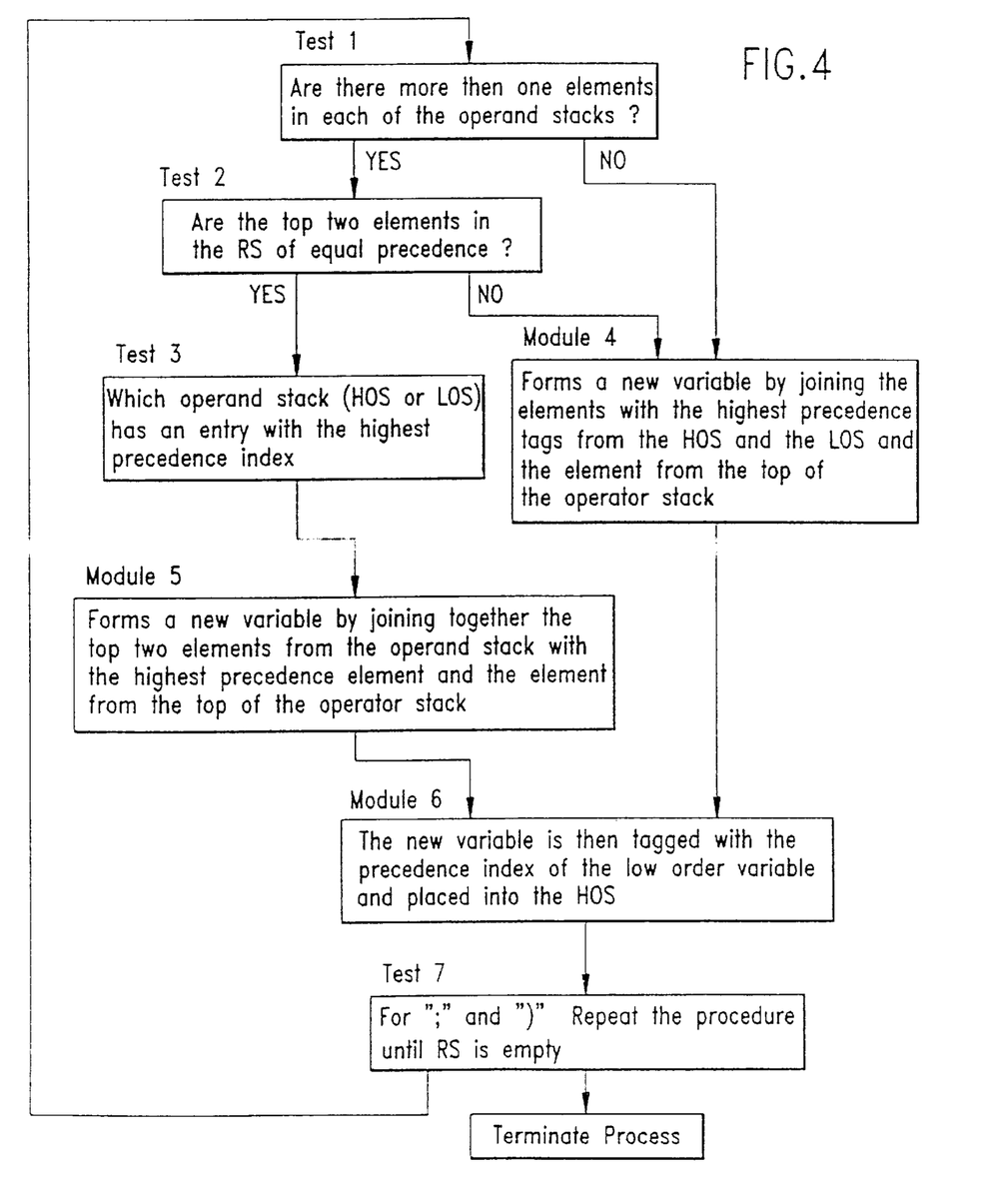
FIG. 4 shows a flowchart of the stack processing phase of the present invention.

Finally, if the character is an end-of-string delimiter, ";", then module 9 invokes the stack processing procedure shown in FIG. 4. The stack processing continues until both the operator stack and the low order operand stack are empty. That void condition implies that the expression has been completely processed and the Polish string form exhibiting maximal parallelism is to be found in the high order operand stack.

Stack Processing

The function of the stack processing procedure phase is to adjoin the proper pair of variables with the appropriate operation, and to place the resulting variables in the high order operand stack with its correct precedence index. Shown in FIG. 4 is the flow diagram 14 of the stack processing procedure. Test 1 determines, if there is more then one element in each of the operand stacks. If there is more then one element, then test 2 is performed to determine if the top two elements in the operator stack are of equal precedence.

If there is more then one element in each of the operand stacks or if the top two elements in the operator stack are not of equal precedence, module 4 forms a new variable by joining the elements with the highest precedence tags from the high order operand stack and the low order operand stack and the element from the top of the operator stack.

If the top two elements in the operator stack are of equal precedence, then test 3 determines which operand stack has the element with the highest precedence tag. Module 5 then forms a new variable by joining together the top two elements from the operand stack with the highest precedence element and the element from the top of the operator stack.

In all cases, the operation is placed first, the low order variable is placed in the second position, and the high order variable is placed in the third position of any newly formed variable. Module 6 tags the new variable with the precedence index of the low order variable and places it into the high order operand stack. Test 7 determines what character triggered the stack processing. The possibilities are a semicolon, a right parenthesis and 2 consecutive operators of the same precedence as shown by module 17 (FIG. 3).

The stack processing is then repeated or terminated based on the criteria of test 7.

Figure 5:
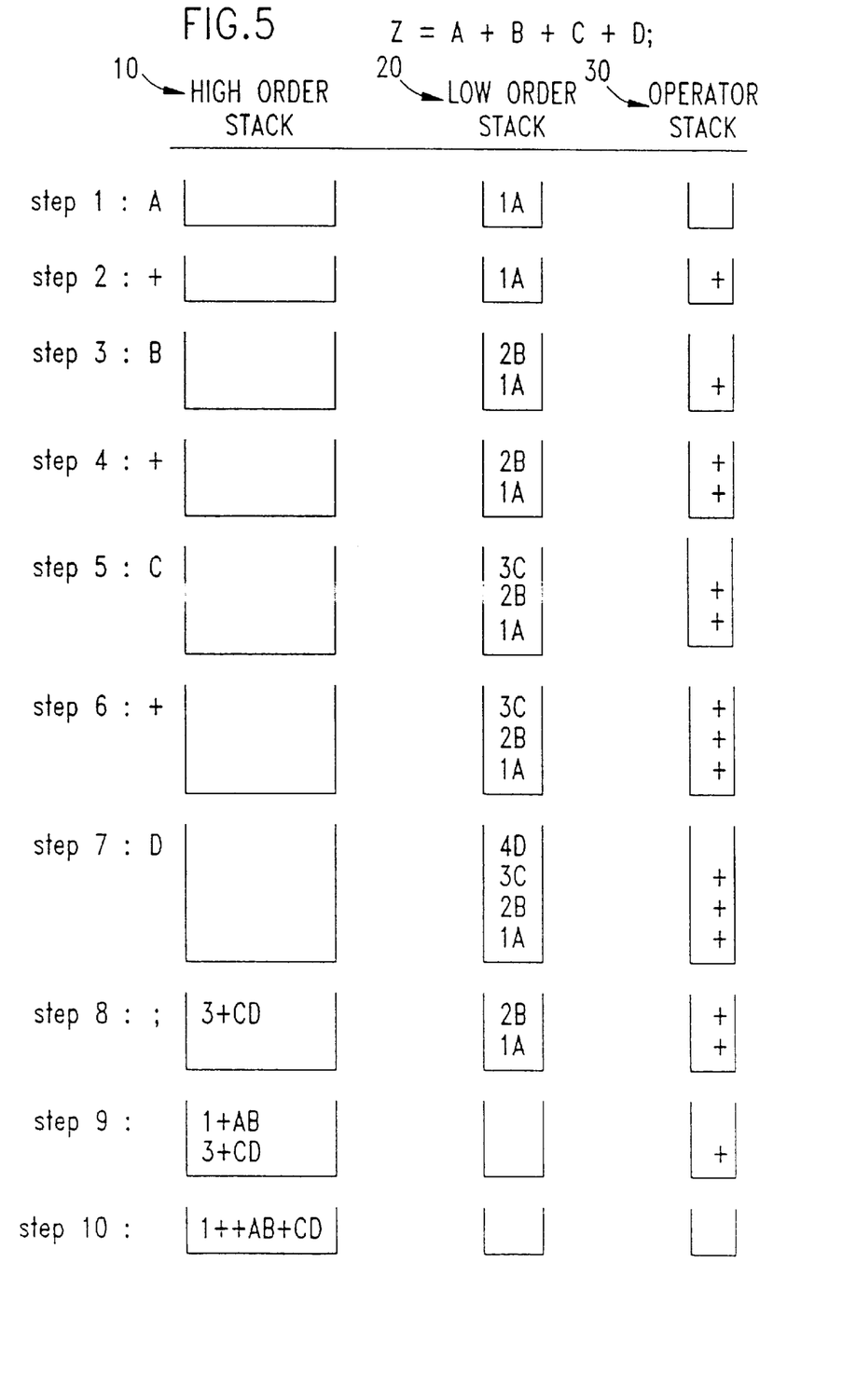
FIG. 5 shows changing contents of memory stacks, as equation "Z=A+B+C+D;" of Example 1 is parsed.

To facilitate understanding, Example 1 shown in FIG. 5 illustrates the operation of the algorithm of the present invention in a step by step scanning and stack processing phases of equation

"Z=A+B+C+D;".

In the initialization phase the pointer is set to scan the first variable of the equation.

In step 1, the character "A" is scanned at the pointer. Variable module 8 (FIG. 3) gives it the precedence index 1 and places it in LOS 20. The precedence index is incremented and the pointer is set to scan the next variable.

In step 2, the character "+" is scanned at the pointer. Operation module 10 (FIG. 3) determines that it is not a unary operation. Test 12 (FIG. 3) determines that there are no other operators present on RS 30 hence, the present operator has higher precedence. Test 13 (FIG. 3) determines that the previous character is not ")". Module 15 (FIG. 3) places the character in RS 30 and the pointer is set to scan the next variable.

In step 3, the character "B" is scanned at the pointer. Variable module 8 (FIG. 3) gives it the precedence index 2 and places it in LOS 20. The precedence index is incremented and the pointer is set to scan the next variable.

In step 4, the character "+" is scanned at the pointer. Operation module 10 (FIG. 3) determines that it is not a unary operation. Test 12 (FIG. 3) determines that the present operator is of equal precedence with the operator present on RS 30. Test 13 (FIG. 3) determines that the previous character is not ")". Module 15 (FIG. 3) places the character in RS 30 and the pointer is set to scan the next variable.

In step 5, the "C" character is scanned at the pointer. Variable module 8 (FIG. 3) gives it the precedence index 3 and places it in LOS 20. The precedence index is incremented and the pointer is set to scan the next variable.

In step 6, the character "+" is scanned at the pointer. Operation module 10 (FIG. 3) determines that it is not a unary operation. Test 12 (FIG. 3) determines that the present operator has equal precedence to the other operators present on RS 30. Test 13 (FIG. 3) determines that the previous character is not ")". Module 15 (FIG. 3) places the character in RS 30 and the pointer is set to scan the next variable.

In step 7, the character "D" is scanned at the pointer. Variable module 8 (FIG. 3) gives it the precedence index 4 and places it in LOS 20. The precedence index is incremented and the pointer is set to scan the next variable.

In step 8, the character ";" is scanned at the pointer, the ";" module 9 (FIG. 3) invokes stack processing. Test 1 determines if there is more then one element in LOS 20, however HOS 10 is empty. Thus, module 4 joins the top two elements in LOS 20 to one another and to the top element of RS 30. Module 6 prefixes the result with the lower precedence number of the variable pair and places the result in HOS 10. Test 7 determines that the scanned character is ";" and that RS 30 is not empty, hence stack processing is repeated.

In step 9, Test 1 determines that LOS 20 and HOS 10 are not empty. Test 2 determines that the top two elements in RS 30 are of equal precedence. Test 3 selects LOS 20 because LOS 20 has entries with higher precedence than HOS 10. Thus module 5 joins the top two elements in LOS 20 to one another and to the top element of RS 30. Module 6 prefixes the result with the lower precedence number of the variable pair and places the result in HOS 10. Test 7 determines that the scanned character is ";" and that RS 30 is not empty, hence stack processing is repeated. In step 10, Test 1 determines that LOS 20 is empty however HOS 10 is not. Thus module 4 joins the top two elements in HOS 10 to one another and to the top element of RS 30. Module 6 prefixes the result with the lower precedence number of the variable pair and places the result in HOS 10. Test 7 determines that the scanned character is ";" and that RS 30 is empty, hence stack processing terminated.

Figure 6A:
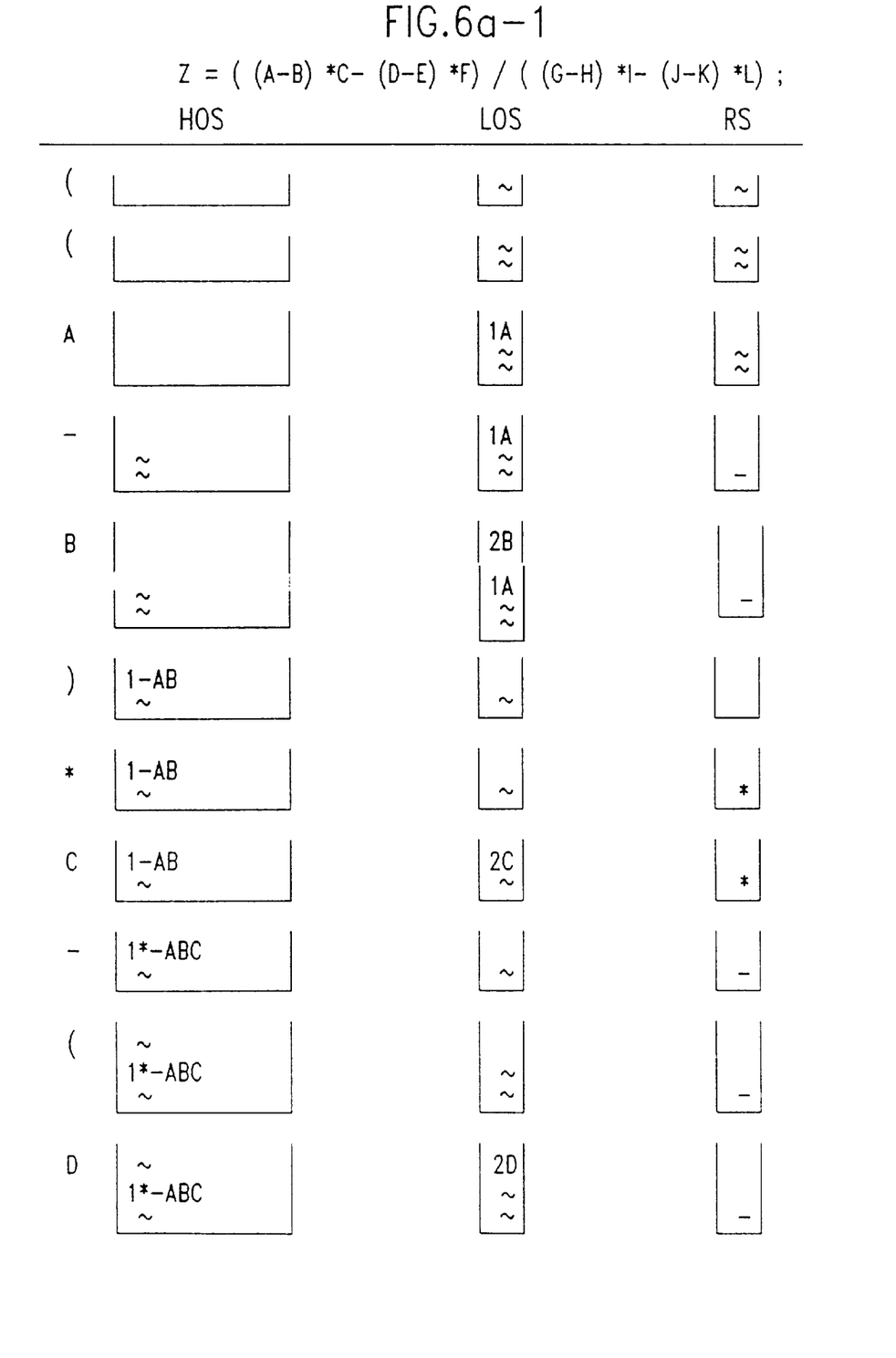
FIGS. 6a–6b show changing contents of memory stacks, as equation "Z=((A−B)*C−(D−E)*F/((G−H)−I−(j−K)−L);" of Example 2 is parsed.
Figure 6A:
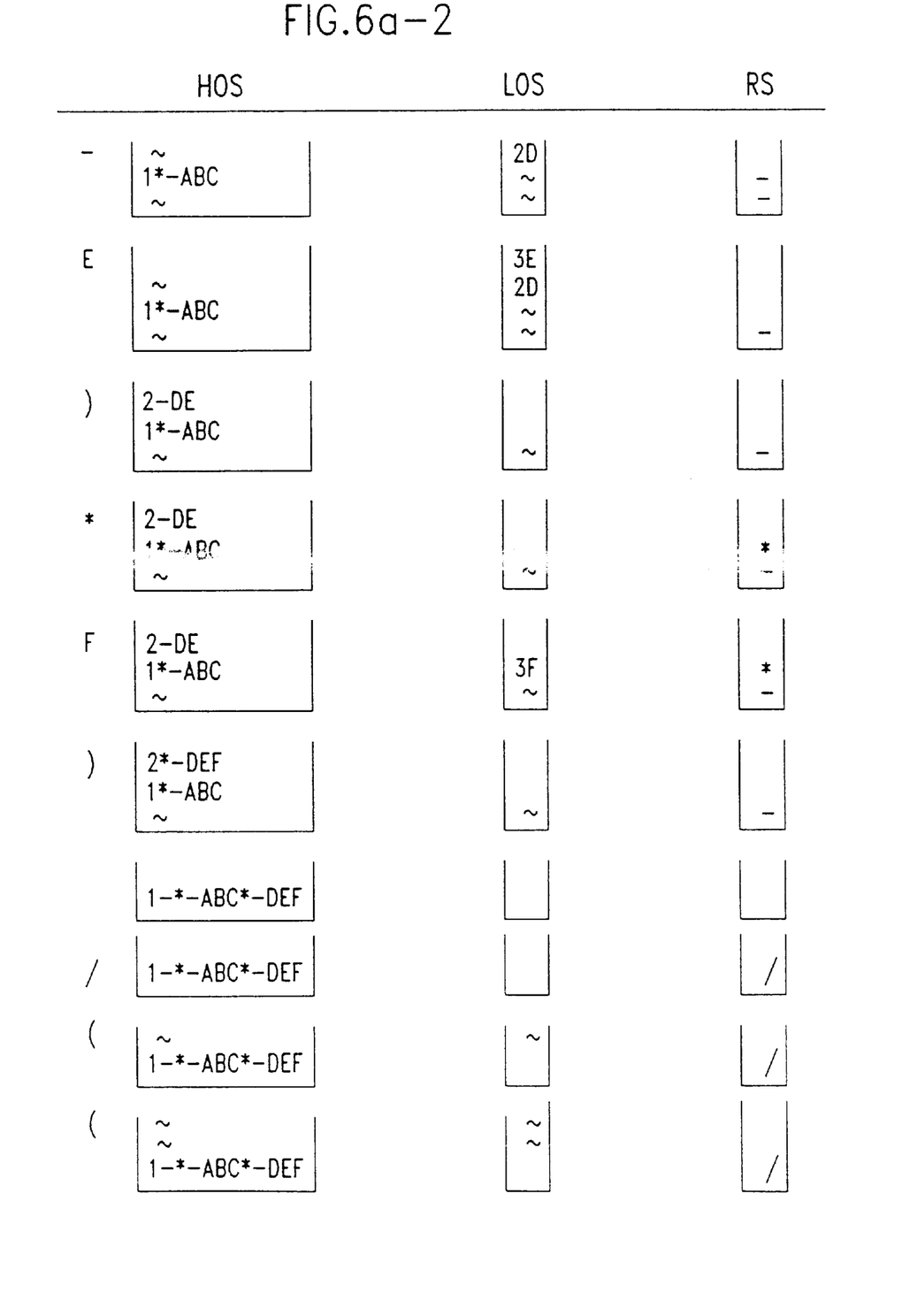
Figure 6B:
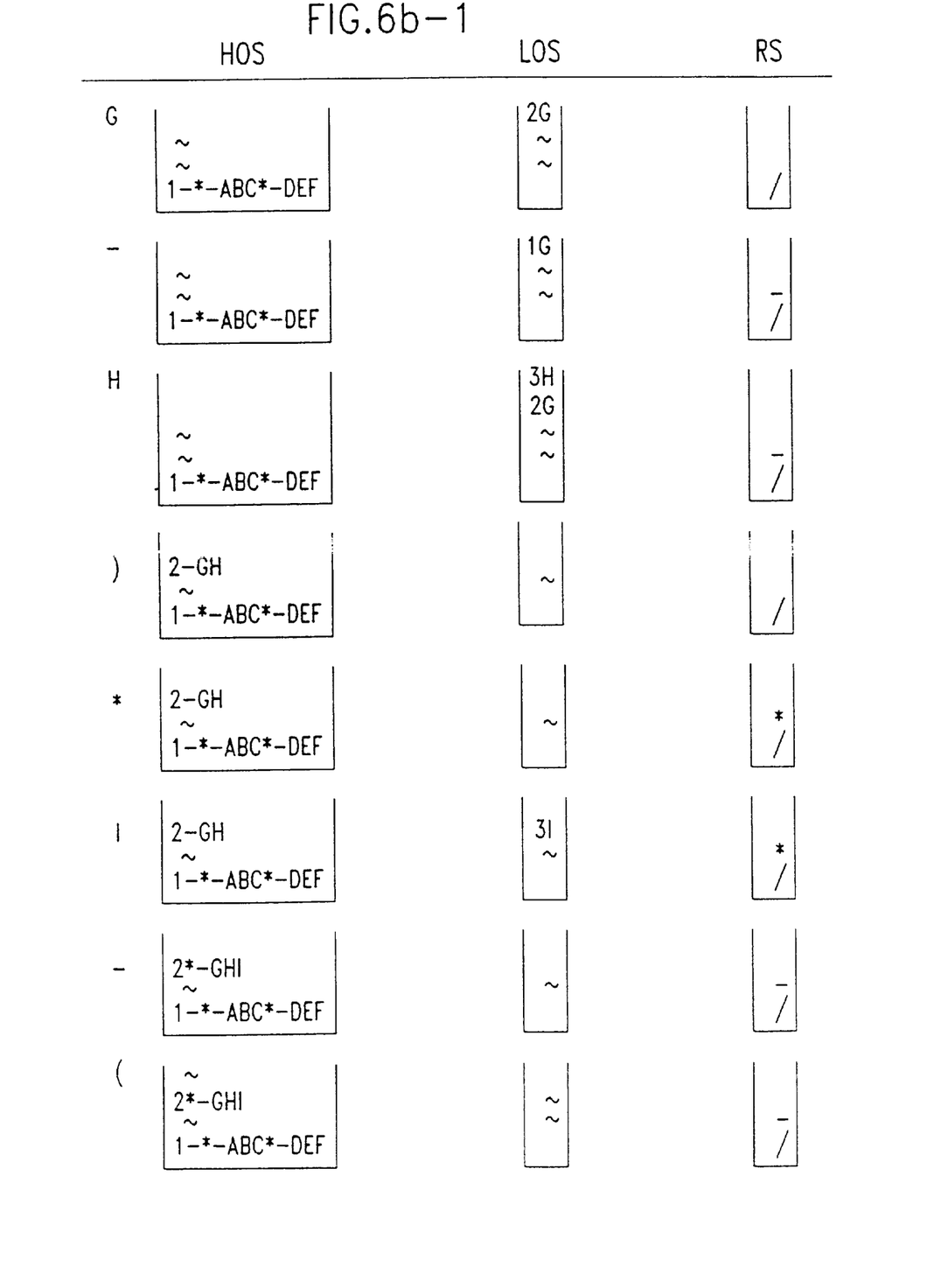
Figure 6B:
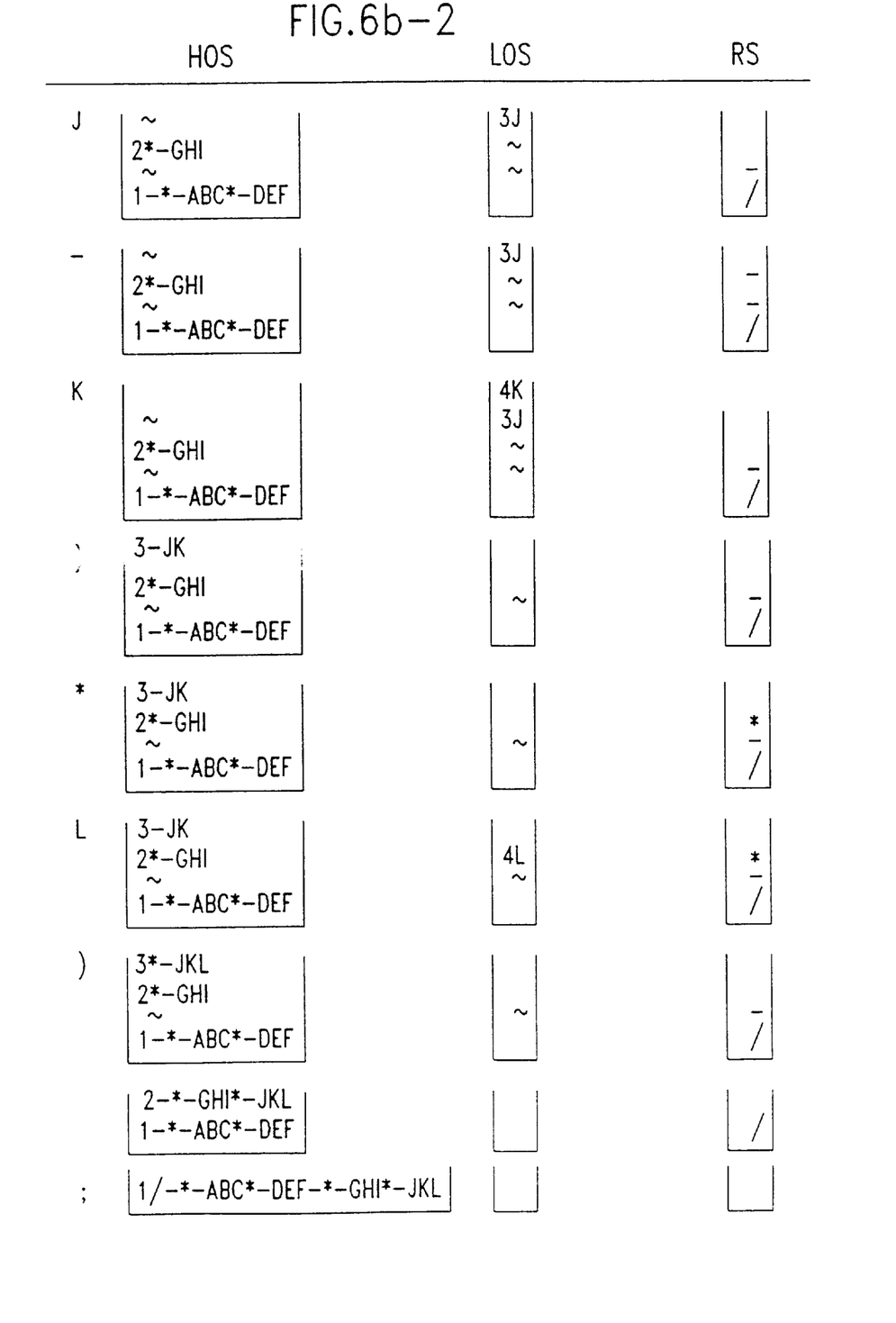

Example 2 shown in FIGS. 6a, 6b illustrates the operation of the algorithm of the present invention in a step by step scanning and stack processing phases of equation

"Z=((A−B)*C−(D−E)*F)/((G−H)*I−(J−K)*L);".

Steps similar to the ones described above should be utilized to transform that equation into a Polish notation form designed for maximal parallelism.

While the invention has been particularly shown and described with respect to illustrative and preferred embodiments thereof, it will be understood by those skilled in the art that the foregoing and other changes in form and details may be made therein without departing from the spirit and scope of the invention that should be limited only by the scope of the appended claims.

What is claimed is:

1. A method for compiler pre-processing of an arithmetic expression for the execution by at least one computer processing unit comprising the steps of:

scanning a character and determining a category of said character;

when a character is a left parenthesis, placing said left parenthesis in a high order operand stack and in a low order operand stack;

when a character is a variable, placing said variable in said low order operand stack;

when a character is a right parenthesis, performing a preidentified stack processing procedure;

when a character is an operators conducting first and second tests to identify redefined conditions of the character, wherein the first test determines the precedence of the scanned operator, and the second test determines the category of a preceding scanned character, and (i) if both the first and second tests are not satisfied, placing the character in an operator stack, and (ii) if either the first test or the second test is satisfied, performing a predefined stack processing procedure; and when a character is a semicolon, performing a preidentified stack processing procedure and stopping processing.

2. The method of claim 1, wherein said category is selected from the group consisting of a variable, an operation, a left parenthesis, a right parenthesis and a semicolon.

3. The method of claim 1 wherein said high order operand stack, said low order operand stack and said operator stack are last-in-first-out computer memory stacks.

4. The method of claim 1, wherein when a character is a variable further comprising the steps of assigning a precedence index to said character and incrementing said precedence index.

5. The method of claim 1, wherein when a character is an operator further comprising the steps of setting of a unary indicator if an operator is unary.

6. The method of claim 1, wherein when a character is a right parenthesis further comprising the step of removing matching left parenthesis from said high order operand stack and from said low order operand stack.

7. The method of claim 5, wherein when a character is a right parenthesis further comprising the steps of prefixing an operator to said variable in said low order operand stack, if the unary indicator is set.

8. The method of claim 1, wherein when a character is an operator said first test determines if said operator has a higher precedence than an operator on said operator stack, and said second test determines if a preceding scanned character is the right parenthesis.

9. The method of claim 1, wherein when a character is an operator a third test determines if there are two entries in said low order operand stack and two operators with the same precedence in said operator stack, and if the element on the top of said operator stack is commutative.

10. A method for compiler processing of stack entries of an arithmetic expression parsed into three computer stacks, into a Polish notation form designed for maximal parallelism comprising the steps of:

performing a first test to determine if there are more than one element in a low order operand stack and in a high order operand stack;

performing a second test to determine if the top two elements in an operator stack, are of equal precedence;

combining two stack entries with highest precedence when the result of either the first test or the second test is negative; and placing said combined two stack entries in said high order operand stack.

11. The method of claim 10, wherein if the results of either said first test or said second test are negative, said combining step is performed on the two entries with the highest precedence index from both said low order operand stack and said high order operand stack.

12. The method of claim 10, wherein if the results of both said first test and said second test are positive, performing a third test to determine whether a low order operand stack or a high order operand stack has an entry with the highest precedence index.

13. The method of claim 12, wherein if the results of both said first test and said second test are positive, said combining step is performed on the two entries of the stack determined in said third test.

14. The method of claim 10, wherein combining of stack entries comprises the steps of:

placing the precedence index of said stack entry with the highest precedence index first;

placing the operator from the top of said operator stack second;

placing the stack entry from said high order operand stack or said low order operand stack with the highest precedence index third; and placing the stack entry from said high order operand stack or said low order operand stack with the second highest precedence index last.

15. The method of claim 10, further comprising repeating the stack processing procedure if said operator stack is not empty and terminating the processing when said operator stack is empty.

16. A computer program device readable by a machine, tangibly embodying a program of instructions executable by a machine to perform method steps for pre-processing of an arithmetic expression for the execution by at least one computer processing unit comprising the steps of:

scanning a character and determining a category of said character;

when a character is a left parenthesis, placing said left parenthesis in a high order operand stack and in a low order operand stack;

when a character is a variable, placing said variable in said low order operand stack;

when a character is a right parenthesis, performing a preidentified stack processing procedure;

when a character is an operator, conducting first and second tests to identify predefined conditions of the character, wherein the first test determines the precedence of the scanned operator, and the second test determines the category of a preceding scanned character, and (i) if both the first and second tests are not satisfied, placing the character in an operator stack, and (ii) if either the first test or the second test is satisfied, performing a predefined stack processing procedure; and when a character is a semicolon, performing a preidentified stack processing procedure and stopping processing.

17. The computer program device of claim 16, wherein said category is selected from the group consisting of a variable, an operation, a left parenthesis, a right parenthesis and a semicolon.

18. The computer program device of claim 16, wherein said high order operand stack, said low order operand stack and said operator stack are last-in-first-out computer memory stacks.

19. The computer program device of claim 16, wherein when a character is a variable further comprising the steps of assigning a precedence index to said character and incrementing said precedence index.

20. The computer program device of claim 16, wherein when a character is an operator further comprising the steps of setting of a unary indicator if an operator is unary.

21. The computer program device of claim 16, wherein when a character is a right parenthesis further comprising the step of removing matching left parenthesis from said high order operand stack and from said low order operand stack.

22. The computer program device of claim 20, wherein when a character is a right parenthesis further comprising the steps of prefixing an operator to said variable in said low order operand stack, if the unary indicator is set.

23. The computer program device of claim 16, wherein when a character is an operator said first test determines and if said operator is not of higher precedence than an operator on said operator stack, and said second test determines if a preceding scanned character is the right parenthesis.

24. The computer program device of claim 16, wherein when a character is an operator a third test determines if there are two entries in said low order operand stack and two operators with the same precedence in said operator stack, and the element on the top of said operator stack is commutative.

25. A computer program device readable by a machine, tangibly embodying a program of instructions executable by a machine to perform method steps for processing of stack entries of an arithmetic expression parsed into three computer stacks, into a Polish notation form designed for maximal parallelism comprising the steps of:

performing a first test to determine if there are more than one element in a low order operand stack and in a high order operand stack;

performing a second test to determine if the top two elements in an operator stack, are of equal precedence;

combining two stack entries with highest precedence when the result of either the first test or the second test is negative; and placing said combined two stack entries in said high order operand stack.

26. The computer program device of claim 25, wherein if the results of either said first test or said second test are negative, said combining step is performed on the two entries with the highest precedence index from both said low order operand stack and said high order operand stack.

27. The computer program device of claim 25, wherein if the results of both said first test and said second test are positive, performing a third test to determine whether a low order operand stack or a high order operand stack has an entry with the highest precedence index.

28. The computer program device of claim 27, wherein if the results of both said first test and said second test are positive, said combining step is performed on the two entries of the stack determined in said third test.

29. The computer program device of claim 25, wherein combining of stack entries comprises the steps of:

placing the precedence index of said stack entry with the highest precedence index first;

placing the operator from the top of said operator stack second;

placing the stack entry from said high order operand stack or said low order operand stack with the highest precedence index third; and placing the stack entry from said high order operand stack or said low order operand stack with the second highest precedence index last.

30. The computer program device of claim 25, further comprising repeating the stack processing procedure if said operator stack is not empty and terminating the processing when said operator stack is empty.

* * * * *